April 9, 1963 T. A. McGREGOR 3,084,953
POSITIONING TRACK FOR TRAILER CASTER
Filed Feb. 19, 1960 2 Sheets-Sheet 1
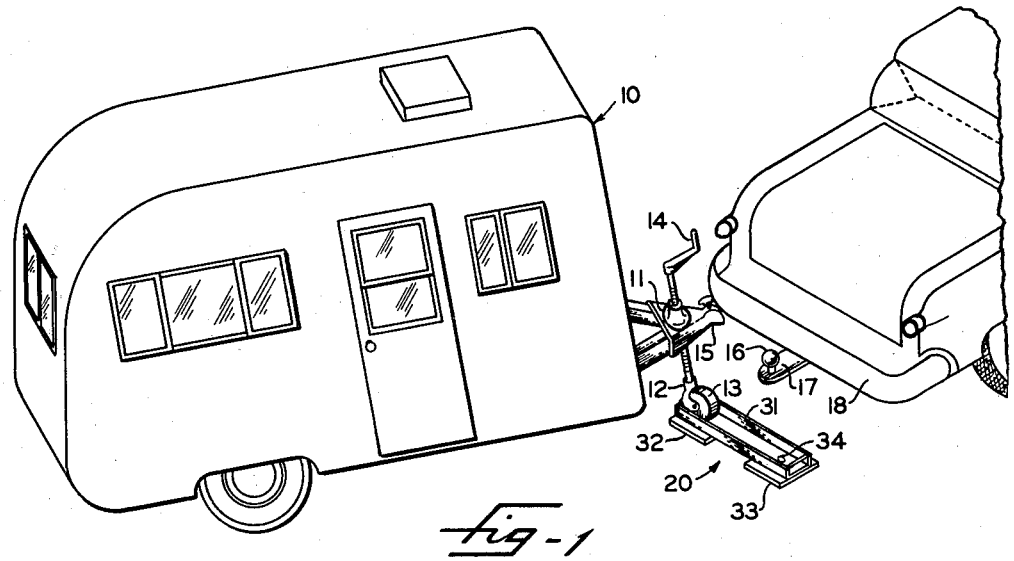
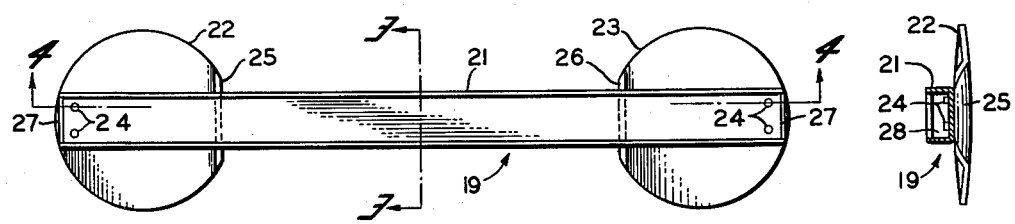
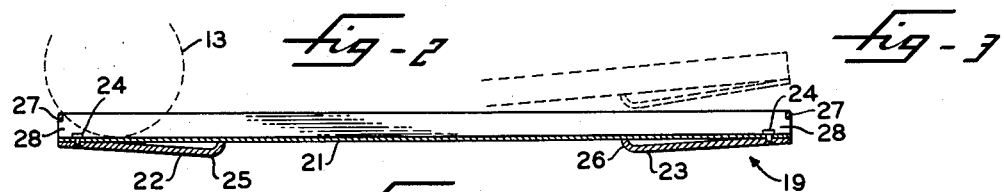
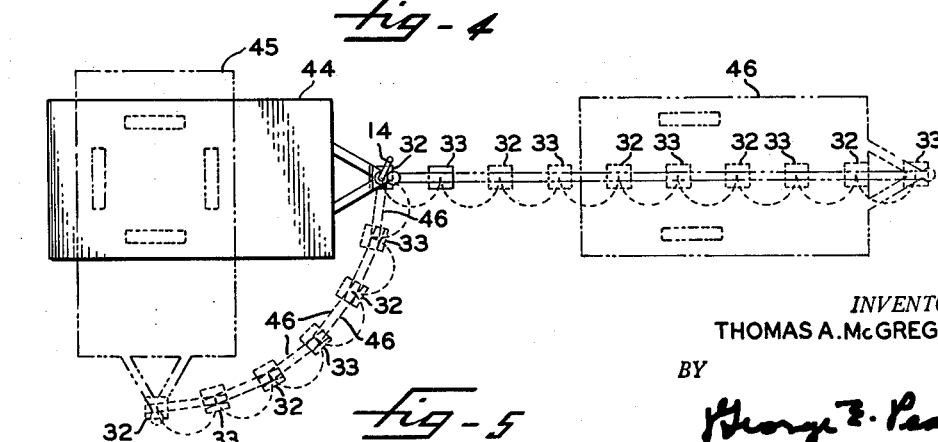
INVENTOR.
THOMAS A. McGREGOR
BY
George E. Pearson
ATTORNEY

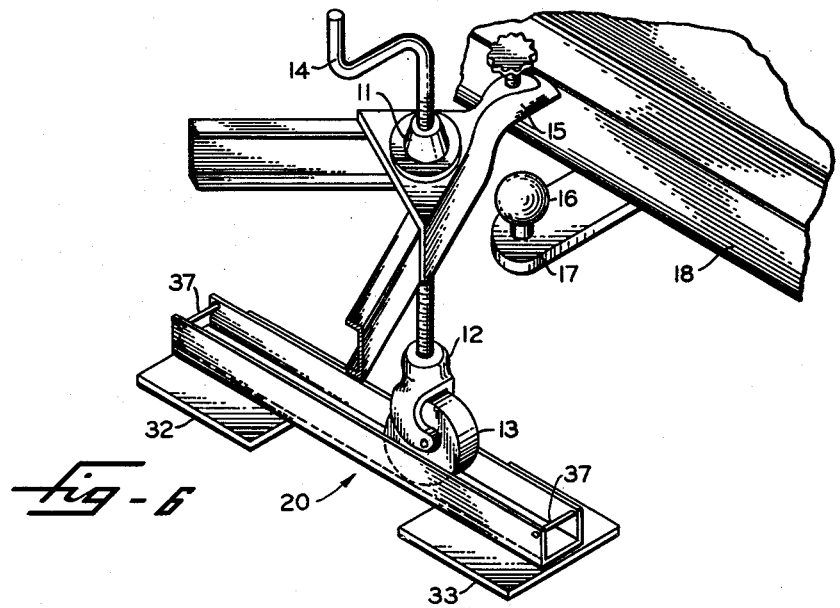
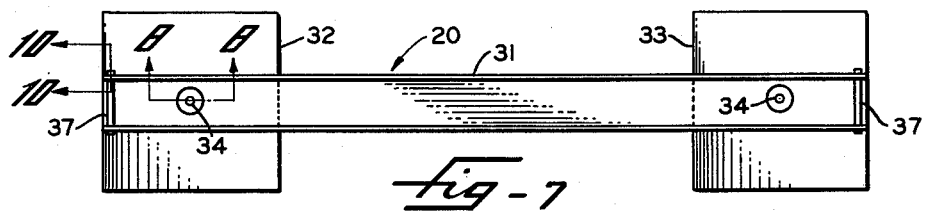
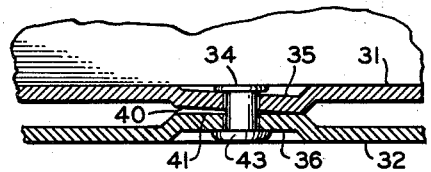
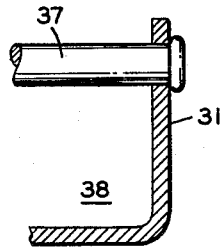
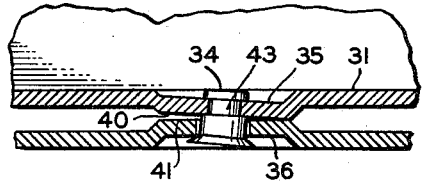
INVENTOR.
THOMAS A. McGREGOR
BY
ATTORNEY United States Patent Office 3,084,953
Patented Apr. 9, 1963

3,084,953
POSITIONING TRACK FOR TRAILER CASTER
Thomas A. McGregor, 705 Nautilus St., La Jolla, Calif.
Filed Feb. 19, 1960, Ser. No. 9,873
16 Claims. (Cl. 280—150.5)

This invention relates generally to surface supports for wheels, casters, and the like, and more particularly to a method and means for supporting and guiding a trailer caster wheel to prevent the same from sinking into a soft ground surface such as loose sand or mud, or from marking or otherwise marring a finished ground surface such as blacktop, and to facilitate limited movements of the trailer into hitching alignment with the towing vehicle, or into precise parking or storage position or the like.

An object of the present invention is to provide a new and improved method of moving a caster supported trailer over a ground surface even though the same may be soft, rough, or inclined.

Another object is to provide a method of moving a caster supported trailer in a series of selectively directed, guided, and limited movements as required to reach a desired parking position or to effect hitching alignment with the towing vehicle.

Another object is to provide a ground supported track for the trailer caster which affords a smooth surface over which the caster wheel can easily roll and be guided thereby to greatly facilitate the necessary pushing and/or pulling of the trailer to reach the parking or hitching position, as the case may be.

Another object resides in the provision of ground engaging pads at the ends of the track which not only afford load bearing support for the trailer but also permit pivotal movement of the caster positioned at one end of the track by turning movement imparted to the other end of the track which for this purpose is used as a crank.

A further object is to provide means for causing the free end of the track to tilt upwardly, as the caster moves to the other end of the track thereby to facilitate manipulation of the track as a crank at its free end for turning movement about its other end serving as a pivot.

Still another object is to provide for pivotal movement of the track with a pad in pivotal engagement with the ground surface or, alternatively, for pivotal movement of the track with respect to the pad which for this purpose maintains a fixed relation with respect to the ground surface.

An additional object is to provide means at each end of the track for limiting the rolling movement of the caster wheel therein.

Still other objects, features, and advantages of the present invention are those inherent in, or to be implied from, the novel combination, construction, and arrangement of parts as will become more clearly apparent from the following description of the best mode thus far devised for practicing the principle of the invention, reference being had to the accompanying drawings wherein:

FIG. 1 is a view in perspective illustrating a house trailer being supported and guided by a caster guide track of the present invention into hitching alignment with a tow car therefor;

FIG. 2 is a plan view of the caster guide track constructed in accordance with one form of the invention;

FIG. 3 is a sectional view taken along the line 3—3 of FIG. 2;

FIG. 4 is a sectional view taken along the line 4—4 of FIG. 2;

FIG. 5 is a schematic view illustrating a series of trailer movements which have been effected by use and manipulation of the guide track of the present invention;

FIG. 6 is a somewhat enlarged fragmentary view of parts shown in perspective in FIG. 1;

FIG. 7 is a plan view of the preferred form of positioning track constructed in accordance with the principle of the present invention;

FIG. 8 is a sectional view taken along the line 8—8 of FIG. 7;

FIG. 9 is a view similar to FIG. 8 and illustrating an alternative pivotal connection; and FIG. 10 is a detail section taken along the line 10—10 of FIG. 7.

Referring now to the drawings and first more particularly to FIG. 1 thereof, the numeral 10 generally designates a house trailer of conventional type having the usual jack 11 which, at the bottom, carries the usual caster 12 having a wheel 13. Jack 11 includes a handle 14 which is cranked to raise or lower the hitch socket 15 relative to the ball 16 which is mounted on the ball hitch 17 carried by the towing vehicle 18, here shown to be an automobile.

The caster wheel supports for most travel trailers usually are narrow, small perimeter wheels which provide only a small bearing surface such that the caster wheel tends to sink into a soft surface. This makes it difficult to maneuver the trailer by simply pushing or pulling the same while supported on the caster, and the same may be said of a rough surface, even though hard. The caster wheel also tends to sink into and damage the blacktop, or like surface, of trailer courts. For this reason court owners usually request that the trailer be positioned before unhitching from the towing vehicle and this, of course, is difficult to do in close quarters. They further usually require that the caster or jack, as the case may be, be supported by a stationary pad or block. In the prior use of caster supported trailers therefore, the caster usually has fixed the parked position of the trailer such that the ball and hitch must be accurately aligned when coupling again to the towing vehicle.

To overcome the foregoing difficulties, various means and devices such as dollies, hand actuated tractor wheels, and the like, have been devised. These, however, have been mechanically complex, expensive to manufacture, cumbersome and bulky to handle, and present storage problems.

According to the present invention, the foregoing difficulties are obviated by provision of a simple, inexpensive, easy to manufacture positioning track for the caster wheel, a positioning track of simplified form being generally designated 19 and a track of preferred form being generally designated 20. In the case of either form, as will hereinafter more fully appear, the track not only provides bearing support for the caster and smooth limited travel of its wheel over the support surface, but also has a pivotal feature which permits directed angular movements of the trailer longitudinally, laterally, or diagonally, as required for parking or for effecting hitching alignment. Moreover, the track may be pivoted alternately at its ends to move the trailer in successive limited increments until the desired position is reached, an ideal bearing and rolling surface being provided all the while for the caster by the track with the additional safety feature being afforded by the provision of blocks at the ends of the track which assure that the trailer will not get away or otherwise get out of hand, particularly when maneuvering the trailer on an incline.

The simplified form 19 of the positioning track is disclosed in FIGS. 2 to 4 and comprises a channel member 21 of U-shaped cross section having sidewalls which rise to a substantial height of the caster wheel in closely fitting relation thereto but permitting free, smooth, and guided rolling movement of the caster wheel in the channel. Track 19 also comprises a pair of ground engaging pads 22, 23 secured respectively to the ends of track member 21 as by a pair of rivets 24, or otherwise suitably secured thereto as by welding, or the like.

Pads 22 and 23 are of circular configuration for a reason subsequently to appear and are curled up at their inner ends 25 and 26, respectively, so that the bottom or ground engaging surfaces of the pads are inclined relative to the bottom surface of track member 21 and converge upwardly towards the ends of the track member. By reason of this arrangement, when the caster wheel 13 moves to either end of the track as shown, for example, by the dashed lines in FIG. 4, the line of contact of the wheel in the bottom of the track lies beyond the curled up edge of the pad and, consequently, the weight of the trailer being brought to bear at this contact line causes the track to be pivoted about the rounded end 25 of pad 22 with the result that the other end of the track is tilted upward and out of engagement with the ground, as indicated by the dashed lines at that end of the track. The elevation of this end of the track facilitates engagement thereof either by hand or by a suitable tool so that the track may now readily be turned as a crank about the pad 22 which is now fully in flush engagement with the ground surface and, being circular, effectively serves as a pivot to facilitate the turning movement of the track.

Wheel 13 is stopped at either end of track member by moving into engagement with a bridging member 27 which is suitably riveted, welded, or otherwise secured to and between the sidewalls at each end of the member, the sidewalls preferably extending upward and appreciable height of the caster wheel 13, as best seen in FIG. 6, and the stop members 27 preferably being positioned the maximum distance above the bottom of the channel member to produce the greatest wheel blocking effect as well as to provide ample openings 28 at the ends of the channel for facilitating removal of sand, mud, and stones, and the like, therefrom.

In a modification of form 19 of the positioning track, the curled ends 25, 26 of the pads may be dispensed with and the pads secured in face adjacency to the under surface of channel member 21. In this case, the slight lifting of the free end of the track which accompanies any attempt to apply a turning movement to this end, particularly when a tool such as a jack handle has been inserted into the channel through the opening 28, insures a free pivotal movement about the ground engaged pad at the other end of the track.

In the preferred form 20 of the positioning track, the channel member 31 is generally of the same configuration as channel member 21 of the simplified form and similarly has bridging members 37 which are riveted to the sidewalls of the channel member 31, as may best be seen in FIG. 10, and provide clean-out openings 38 in the ends of the channel in the same manner and for the same purpose as aforedescribed. Rivets 37 preferably are headed sufficiently as by spinning to firmly secure them in position without buckling, swelling, or otherwise distorting the same.

Unlike pads 22 and 23 of the simplified form, pads 32 and 33 of positioning track 20 are each pivoted to channel member 31 as at 34, and do not pivot or otherwise move rotationally relative to the ground surface. To this end pads 32, 33 are preferably formed of square plates, as shown, to effect economies of manufacture and packaging. It is further preferred that each end of the channel member lie just within the perimeter of its associated pad for each 90° rotational position of the channel member relative to the pad so that there is no chance for snagging of the ends of the channel member on the perimeter of the pads during relative pivotal and rotational movements therebetween as effected by the means presently to be described by reference to FIGS. 8 and 9.

Channel member is dimpled as at 35 concentrically with each of the pivot points 34 and each pad 32, 33 is correspondingly dimpled as at 36 except that dimple 35 is directed downward whereas dimple 36 is directed upward and the under surface 40 of dimple 35 is inclined with respect to the bottom surface of channel member 31, converging upwards towards the corresponding end of the channel member, whereas the top surface 41 of dimple 36 is flat.

A suitable rivet 43 provides the pivotal connection between channel member 31 and each of pads 32, 33. In FIG. 8, rivet 43 is loosely inserted in apertures formed therefor in the dimples concentrically with the pivot axes 34, the rivet having sufficient length to permit the required free tilting of the channel member relative to the pads, and the rivet preferably being headed as by spinning to assure the loose fit. The loose pivotal connection of the pads on the channel member enables the track to accommodate itself to an uneven ground surface. It is preferred that the head of the rivet be confined within the depression formed by dimple 35 to thereby avoid engagement with the caster wheel and possible interference with the free tilting movement of channel member 31. This contingency is avoided in the arrangement of FIG. 9 wherein the head of rivet 43 is confined within the depression formed by dimple 36 and moves freely therein as the track member is tilted, the rivet in this case being shouldered and rigidly riveted to channel member 31.

In either arrangement of FIGS. 8 and 9, when wheel 13 approaches an end of member 31 and its line of contact therewith on either side of rivet 43 moves into the vicinity of point 34, member 31 is tilted to move the dimple surfaces 40, 41 together to form a reduced bearing surface to thereby facilitate the turning movement of member 31 about these surfaces as a pivot, and the opposite end of the track is elevated above the ground surface as before.

In the use of the positioning track, the trailer 10 is moved by the towing vehicle 18 as close as possible to the desired parking position and wheel 13 is lowered into one end of the track as seen, for example, in FIG. 6, the track being first directed in the direction of desired movement of the trailer. The trailer is then pushed or pulled until the caster wheel rolls to the opposite end of the track where the automatic tilting feature becomes effective to elevate the other end of the track. Using this end of the track as a crank, the caster wheel may then be rotated to further direct and move the trailer for further limited movement along the track, the track being automatically returned to ground level as the caster wheel moves away from either end of the track. By this means, the trailer may be moved as shown in FIG. 5, for example, from the longitudinal position 44 to the lateral position 45. In this case the track is pivoted alternately about the pads through successive 180° plus movements as indicated by the dashed lines 46. Or the trailer may be moved in a series of straight lines or movements to position 46. In such pivotal movements of the track about one of its pivot pads, this is accomplished with relative ease by reason of the reduced bearing surface 40, 41.

In aligning the hitch for coupling to the towing vehicle, the car 18 is backed up so that the ball 16 is within eighteen inches, or so, of the trailer socket 15, as seen in FIG. 1, and the socket is jacked up high enough to pass over the ball. The track and caster are then turned so that the track lies parallel to the line between the socket and ball, after which the trailer is pushed or pulled to move the caster along the track until the socket is directly above the ball, as seen in FIG. 6. Jack 11 may then be lowered to complete the hitching engagement between the socket and ball.

As will be apparent from FIG. 6, the caster axis will lie on opposite sides of the track pivot axis 34 depending on whether the caster wheel axis leads or lags the caster axis. Thus, when wheel 13 rolls in the direction of pad 32, the caster axis leads the roller axis and will ultimately reach a position which lies between the track pivot axis 34 for pad 32 and stop 37 at that end of the track. When wheel 13 rolls toward pad 33, however, the caster axis lags the roller axis and in its ultimate position as wheel 13 engages stop 37 at that end of the track, the pivot axis 34 will lie between stop 37 and the caster axis. This has the effect that the caster axis, and hence the trailer, will be moved rotationally about the pivot axis 34 from one caster axis position to the other for each 180° track turning movement about one of the pivot axes 34. In practice it has been found that this is accomplished with relative ease by reason of the leverage afforded by the track which preferably is of the order of two feet long.

The track channel and pads may be formed of any material suitable for the purpose such as aluminium or steel, or the like, and may be formed in any manner suitable for the purpose as by braking, extruding, and the like. In practice, it has been found that a channel in the form of an aluminum extrusion of one eighth inch thickness and aluminum pads of the same thickness in the form of plates six inches square give satisfactory results, not only from the standpoint of strength, weight, and ease and economy of manufacture, but from the standpoint of appearance and durability as well.

From the foregoing it should now be fully apparent that positioning track embodiments and configurations and methods of use thereof have been provided which are well adapted to fulfill the aforestated objects of the invention. It is to be understood, however, that the invention may be embodied in other forms or carried out in other ways without departing from the spirit or essential characteristics thereof.

The embodiments of the invention hereinbefore disclosed therefore and the methods involved therein are to be considered as in all respects illustrative and not restrictive, the scope of the invention being indicated by the appended claims, and all changes which come within the meaning and range of equivalency of the claims are intended to be embraced therein.

Having thus described my invention, what I claim as new and desire to secure by Letters Patent is:

1. The method of moving and guiding a caster supported trailer over a soft or rough ground surface comprising the steps of interposing a ground supported track of limited length between the caster wheel and said ground surface and directing the wheel against a stop selectively at either end of the track, elevating the opposite end of the track by the weight of the trailer on the selected end of the track, as the wheel moves to engage said stop, directing said track and said caster wheel thereon in the direction of desired trailer movement by cranking said elevated end of the track to pivot the same and the wheel thereon as a unit and generally about the caster axis of the wheel and said selected end of the track, pushing or pulling the trailer to roll the caster wheel along the track and against the stop at said opposite end of the track, restoring both ends of the track to ground engaging position by the weight of the trailer on the track as the wheel is moved away from the stop position as said selected end of the track, and elevating said selected end of the track by the weight of the trailer on said opposite end of the track as the wheel moves to engage the stop thereat.

2. The method as claimed in claim 1 and comprising the further steps of alternately cranking and pivoting the ends of the track and rolling the wheel therebetween until the trailer has traversed the desired distance and is positioned with the desired direction.

3. The method of moving and guiding a caster supported trailer over a soft or rough ground surface comprising the steps of rolling the caster wheel back and forth along a smooth track of limited length supported on said ground surface, and alternately pivoting said track and wheel as a unit about the ends of the track and about the caster axis of the wheel as the wheel moves into each end position thereby to give desired direction to each of said rolling movements of the caster wheel along the track.

4. The method of moving and guiding a caster supported trailer over a soft or rough ground surface comprising the steps of supporting the caster wheel on a guide track of limited length, supporting the ends of the track on ground engaging pivots, rolling the caster wheel in a series of back and forth movements along the track and between the ends thereof, and alternately rotating the track and wheel as a unit about said pivots and caster axis of the wheel respectively when the wheel is in the corresponding end positions thereby to give desired direction to each of said rolling movements of the caster wheel along the track.

5. The method as in claim 4 and comprising the further step of elevating either end of the track by the weight of the trailer on the caster at the other end of the track.

6. The method as in claim 5 and comprising the additional step of restoring both ends of the track to ground engaging position by the weight of the trailer on the caster wheel and in response to movement of the same between the ends of the track.

7. In combination with a trailer caster wheel, a track of limited length for directing turning movements of the caster wheel about its caster axis and for supporting and guiding said wheel for free rolling movement along said track selectively to either of the ends thereof and over a soft or rough ground surface, said track comprising means at both said ends pivotally supportable at either end thereof on said surface for effecting said turning movements of the caster wheel together with turning movements of the track about said ends thereof.

8. The combination as in claim 7, said track comprising a channel member of U-shape cross section and said means comprising ground engaging pads secured respectively to the ends thereof.

9. The combination as in claim 8, the inner ends of said pads being curved upward so that the surface of each pad and the bottom surface of said channel member converge toward the end of the member associated with each said pad.

10. The combination as in claim 8, said pads being pivotally connected respectively to said channel member near the ends thereof.

11. The combination as in claim 8, said channel member having a stop member at each end thereof which bridges its sidewalls and forms a clean-out opening at each end of the channel.

12. In combination with a trailer caster wheel, a track of limted length for directing turning movements of the caster wheel about its caster axis and for supporting and guiding said wheel for free rolling movement over a soft or rough ground surface, said track comprising means pivotally supported at either end thereof on said surface for effecting said turning movements, said track comprising a channel member of U-shape cross section and having ground engaging pads secured respectively to the ends thereof, said pads being pivotally connected respectively to said channel member near the ends thereof, said pads comprising plate members each having an upwardly extending dimple concentric with the pivot axis of its pivotal connection with said channel member, and said channel member having a downwardly extending dimple for each said upwardly extending dimple for pivotal coaction therewith, each said downwardly extending dimple having an under surface which converges with the under surface of said channel member toward the corresponding end thereof.

13. The combination as in claim 12, said coacting dimples being pivotally connected by a rivet secured to one of said dimples in fixed relation thereto and to the other for limited movement relative thereto, each said rivet having a head at each end disposed within the depression of the corresponding dimple.

14. A positioning track for a trailer caster comprising a U-shaped channel member which slidingly interfits the side walls of the caster wheel, a pair of ground engaging pivot pads secured respectively to the ends of said channel member, and a pair of wheel stops respectively bridging the side walls of the channel member at the ends thereof and providing clean-out openings in the channel at said ends, each of said pads having means operable as the wheel moves to engage the stop at its end of the channel for elevating the pad at the other end of the channel and operable as the wheel moves away from the stop at each end of the channel for moving both of said pads into ground engaging position.

15. A track as in claim 14, said pads being fixedly secured to said channel member and having rounded ground engaging surfaces for ease of turning movement of the track and caster about the caster axis.

16. A positioning track for a trailer caster comprising a U-shaped channel member which slidingly interfits the side walls of the caster wheel, a pair of ground engaging pivot pads secured respectively to the ends thereof, and a pair of wheel stops respectively bridging the side walls of the channel member at the ends thereof and providing clean-out openings in the channel at said ends, means responsive to the weight of the trailer on the track for elevating one of the pads above the surface of the ground when the caster wheel is positioned against the stop at the other end of the track, means for pivotally connecting said pads to the channel member such that when the caster wheel is engaged by one of said stops the line of wheel contact with the channel member lies between said one of the stops and the pivot axis of the pad at the corresponding end of the channel member, said elevating means being associated with said pivotal connections of the pads and effective as the caster wheel moves beyond said axis toward the stop to tilt the channel member and thereby elevate the pad at the opposite end of the track.

References Cited in the file of this patent
UNITED STATES PATENTS

| | | |
|---|---|---|
| 1,065,989 | Verbeke | July 1, 1913 |
| 1,433,922 | Williams | Oct. 31, 1922 |
| 2,472,514 | Brinkley | June 7, 1949 |
| 2,774,606 | Burweger et al. | Dec. 18, 1956 |